(12) United States Patent
Piazza

(10) Patent No.: US 6,444,937 B1
(45) Date of Patent: Sep. 3, 2002

(54) GAS-INSULATED SWITCHING DEVICE

(75) Inventor: Costante Piazza, Lodi (IT)

(73) Assignee: ABB Trasmissione & Distribuzione SpA, Milan (IT)

( * ) Notice: Subject to any disclaimer, the term of this patent is extended or adjusted under 35 U.S.C. 154(b) by 0 days.

(21) Appl. No.: 09/786,348

(22) PCT Filed: Sep. 15, 1999

(86) PCT No.: PCT/EP99/07001

§ 371 (c)(1), (2), (4) Date: Mar. 12, 2001

(87) PCT Pub. No.: WO00/17975

PCT Pub. Date: Mar. 30, 2000

(30) Foreign Application Priority Data

Sep. 17, 1998 (IT) .......................................... MI98A2022

(51) Int. Cl.[7] ............................................... H01H 33/70
(52) U.S. Cl. ........................................... 218/68; 218/43
(58) Field of Search ............................. 218/68, 43, 46, 218/47, 70

(56) References Cited

U.S. PATENT DOCUMENTS 3,614,355 A 10/1971 Boersma
4,379,957 A * 4/1983 Calvino ...................... 218/68
5,099,389 A 3/1992 Ciboldi

FOREIGN PATENT DOCUMENTS

| DE | 196 12 565 | | 10/1997 | | |
|---|---|---|---|---|---|
| DE | 19816506 A1 | * | 4/1998 | ..................... | 218/1 |
| FR | 2770696 A1 | * | 10/1997 | ................. | 218/145 |
| GB | 1 492 037 | | 11/1977 | | |

* cited by examiner

Primary Examiner—Lincoln Donovan
Assistant Examiner—Marina Fishman
(74) Attorney, Agent, or Firm—Oblon, Spivak, McClelland, Maier & Neustadt, P.C.

(57) ABSTRACT

An interruption and disconnecting device for high or medium voltage applications including a disconnection chamber and an interruption pole having a casing that delimits a free volume accommodating an interruption chamber. The interruption chamber contains a moving contact and a fixed contact. The interruption pole and the disconnection chamber contain dielectrically insulating fluids. The interruption chamber is sealed with respect to a remaining part of the interruption pole.

13 Claims, 3 Drawing Sheets

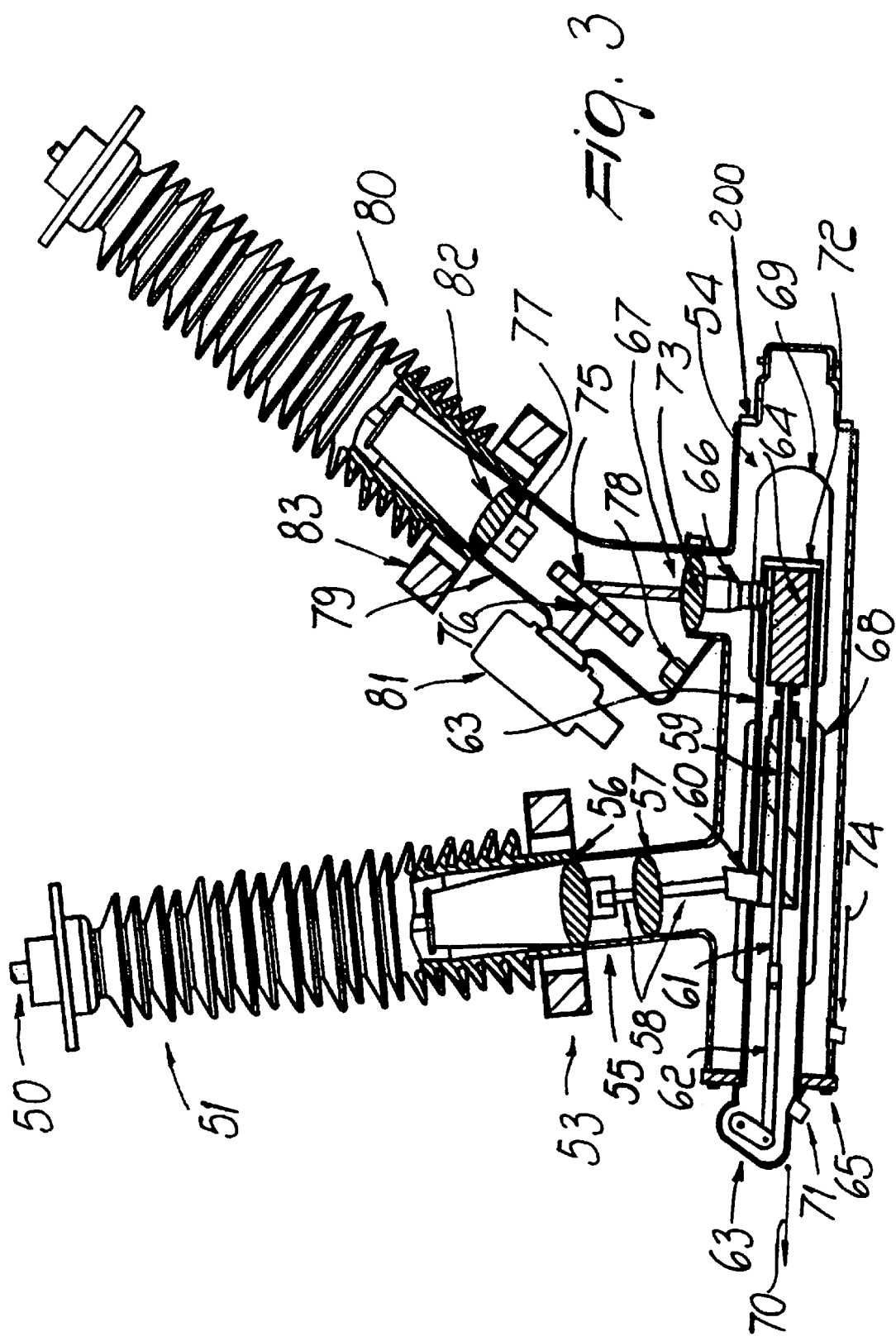

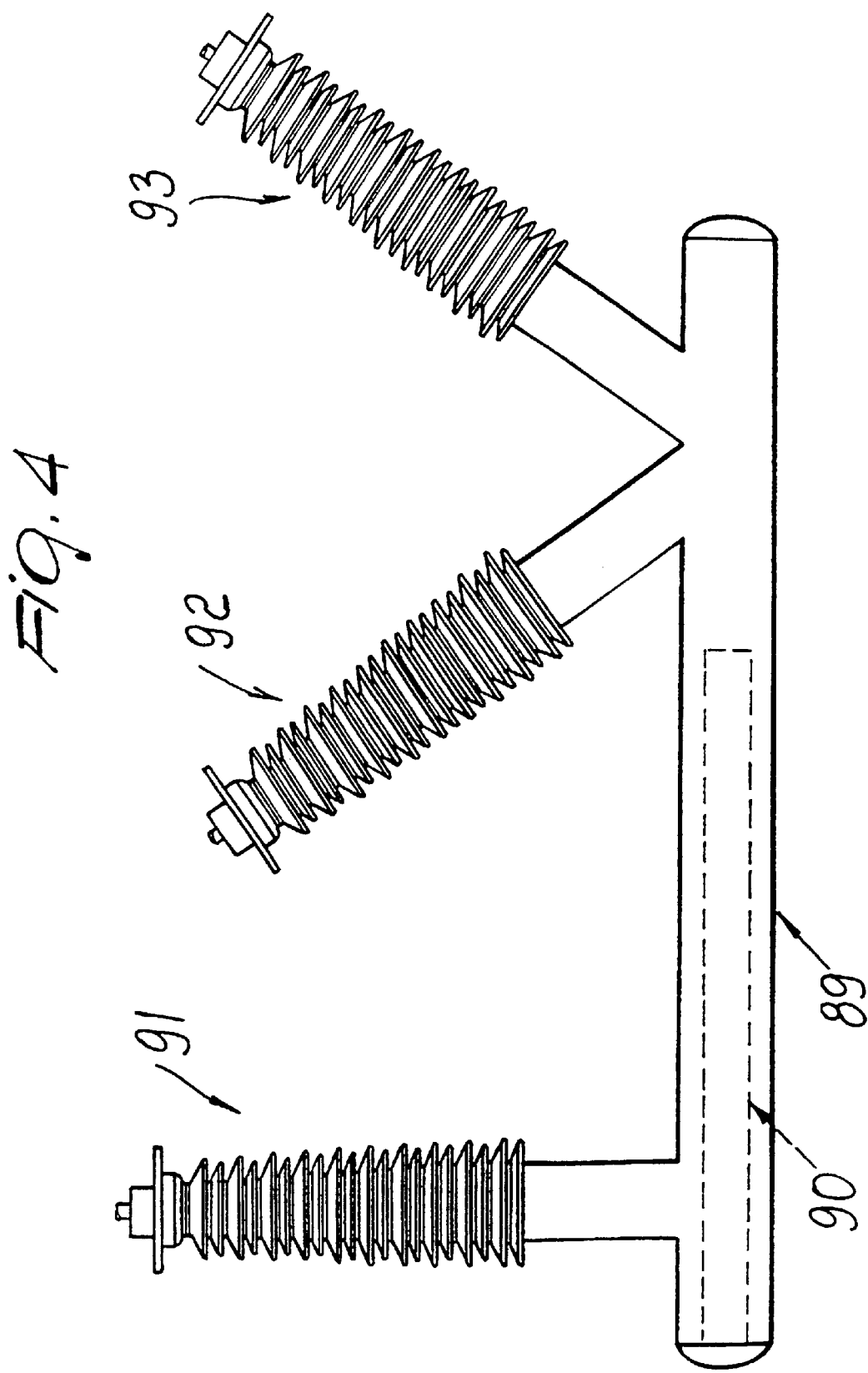

US 6,444,937 B1

GAS-INSULATED SWITCHING DEVICE

BACKGROUND OF THE INVENTION

1. Field of the Invention

The present invention relates to an interruption and disconnecting device for high- and/or medium-voltage applications, which contains dielectric insulation means and has a particular structure, so as to allow the reduction of the environmental impact of said insulation means.

2. Description of the Related Art

It is known that the interruption and disconnecting devices of the art generally comprise at least one interruption chamber and a disconnection chamber which are connected to insulating bushings. These elements are arranged inside a structure which is sealed with respect to the surrounding environment and is filled with a fluid insulating medium. With reference to FIG. 1, a block diagram is presented which illustrates an example of a typical structure of a known interruption and disconnecting device used in a high-voltage substation.

A conductor of a main power line, indicated by the arrow 2, is connected to a main distribution bar 3 by means of the interruption and disconnecting device 1. Said interruption and disconnecting device 1 comprises an insulating bushing 4 for connection to the line 2. a disconnection chamber 5, an interruption chamber 6, electric current measuring devices 7 and 8 arranged at the ends of the interruption chamber 6, and an insulating bushing 9 for connection to the bar 3 by means of a conductor 10. There are also two devices 11 and 12 used to earth the system.

The disconnection chamber 5 can be arranged both upstream and downstream of the interruption chamber 6.

The device 1 is completely filled with an insulating medium in order to prevent electrical discharges between the various parts that are at high potential differences.

A known embodiment of an interruption and disconnecting device according to the block diagram of FIG. 1 is presented with reference to FIG. 2. The insulating bushings 4 and 9 are arranged respectively in input and in output with respect to the interruption and disconnecting device 1. The insulating bushing 4 contains the conductor 2 of the main power line, while the insulating bushing 9 contains the conductor 10 connected to the main distribution bar (not shown in FIG. 2).

The insulating bushing 4 is connected to the disconnection chamber 5 by means of a coupling 13. The disconnection chamber 5 contains a fixed contact 14 and a moving contact 15 for performing disconnection. An earthing device 11 is also connected to the chamber 5 and connects, if required, the main conductor 2 to the outer casing, 16 of the device 1, which is at ground potential by means of the supports 17, 18 and 19. Actuation elements 20 for moving the moving contact 15 are also placed inside the disconnection chamber 5. The disconnection chamber 5 is furthermore separated from the insulating bushing 4 and from the disconnection chamber 6 by means of the insulating partitions 21 and 22.

The interruption chamber 6 contains a moving contact 23 and a fixed contact 24. The moving contact 23 is actuated by movement elements 25. Further, the earthing device 12 is connected to the interruption chamber 6 and places the conductor 26 in output from the disconnection chamber at ground potential. The moving contact 23 is connected to the conductor 10 in output from the interruption and disconnecting device 1. The interruption chamber 6 is separated from the insulating bushing 9 by means of the insulating partition 28. The insulating bushings 4 and 9, the interruption chamber 6 and the disconnection chamber 5 are completely filled with an insulating fluid, generally sulfur hexafluoride ($SF_6$), having a pressure which is higher than the atmospheric one. In order to maintain said internal pressure, required in order to achieve reduced insulation distances and therefore reduce the dimensions of the structure. the device 1 is completely sealed with respect to the outside environment.

Alternative configurations with respect to the one described in FIGS. 1 and 2 are possible. In particular, it is possible to use multiple disconnection chambers and multiple insulating bushings if it is necessary to connect multiple distribution bars to the main power line.

In the interruption and disconnecting devices of the art, the insulation fluid that is generally used is sulfur hexafluoride ($SF_6$). Other known fluids are fluorocarbons (FC), perfluorocarbons (PFC), perfluoropolyethers (PFPE) or mixtures thereof.

The use of these insulation means, particularly $SF_6$, which has the highest dielectric insulation capacity, allows to considerably reduce the insulation distances and therefore to considerably reduce the dimensions of each single device, and therefore of the substation in which it is used, with respect to the use of insulating means, such as mineral oils. This fact leads to a considerable reduction in installation and operating costs.

It is known from the technical literature that known fluoridized gaseous insulating means, in particular $SF_6$, may cause problems in terms of environmental impact; furthermore they are considerably expensive.

Reducing the content of these insulating means by using alternative dielectric fluids, such as for example mixtures of $SF_6$ and nitrogen ($N_2$), pure nitrogen or noble gases leads to an increase in the required insulation distances, since said alternative fluids have, for an equal pressure, a much lower dielectric strength and arch quenching power than, for example, $SF_6$ used in its pure state. Simple replacement of $SF_6$ with other alternative insulation fluids without performing any structural modification to the interruption and disconnecting device would cause malfunctions.

On the other hand, if the pressure of said alternative insulating fluids is increased so as to ensure satisfactory dielectric strength and arc quenching power, it is necessary to resort to complicated structures which are economically scarcely competitive and scarcely reliable.

BRIEF SUMMARY OF THE INVENTION

The aim of the present invention is to provide an interruption and disconnecting device for high- and/or medium-voltage applications, whose structure has a reduced complexity and is capable of optimizing the use of the insulation means used, so as to considerably reduce their environmental impact.

Within the scope of this aim, an object of the present invention is to provide an interruption and disconnecting device for high- and/or medium-voltage applications. which has a modular structure which allows to partition the volume of the insulating fluids used inside the interruption pole.

Another object of the present invention is to provide an interruption and disconnecting device for high- and/or medium-voltage applications, in which it is possible to use different insulation means inside the interruption pole.

Another object of the present invention is to provide an interruption and disconnecting device for high- and/or medium-voltage applications, which allows easy maintenance and/or replacement of the electric actuation elements, particularly of the parts that are most exposed to wear, such as the fixed contact and the moving contact of the interruption chamber.

Another. but not last, object of the present invention is to provide an interruption and disconnecting device for high- and/or medium-voltage applications. which is highly reliable and relatively easy to manufacture and at competitive costs.

This aim. these and other objects, which will become more apparent hereinafter, are achieved by an interruption and disconnecting device for high- and/or medium-voltage applications, comprising a disconnection chamber and an interruption pole having a free volume accommodating an interruption chamber which contains a moving contact and a fixed contact, said interruption pole and said disconnection chamber containing dielectrically insulating fluids. The device according to the invention is characterized in that said interruption chamber is sealed.

In this way. the device according to the invention has a modular structure which allows to optimize the use of dielectric fluids and to reduce the environmental impact; in fact, the dielectric fluids which have a high environmental impact are used only in the sealed interruption chamber where a high arc quenching power is required.

Another advantage of the device according to the invention, consists in the fact that the interruption chamber can be extracted from the main body of the electric interruption pole. This allows easy maintenance and/or replacement of the parts most subject to wear during the interruption and disconnection actuations by virtue of the possibility to extract the sealed interruption chamber from the body of the electric pole. Furthermore, the device according to the invention is constituted by a relatively small number of parts and ensures high reliability and easy execution.

BRIEF DESCRIPTION OF THE DRAWINGS

Further characteristics and advantages of the invention will become more apparent from the description of some preferred but not exclusive embodiments of an interruption and disconnecting device according to the invention, illustrated by way of non-limitative example in the accompanying drawings, wherein:

FIG. 3 is a preferred but not exclusive embodiment of an interruption and disconnecting, device according to the present invention; and FIG. 4 illustrates schematically an alternative embodiment of an interruption and disconnecting device according to the present invention.

DETAILED DESCRIPTION OF THE PREFERRED EMBODIMENTS

Figure 1:
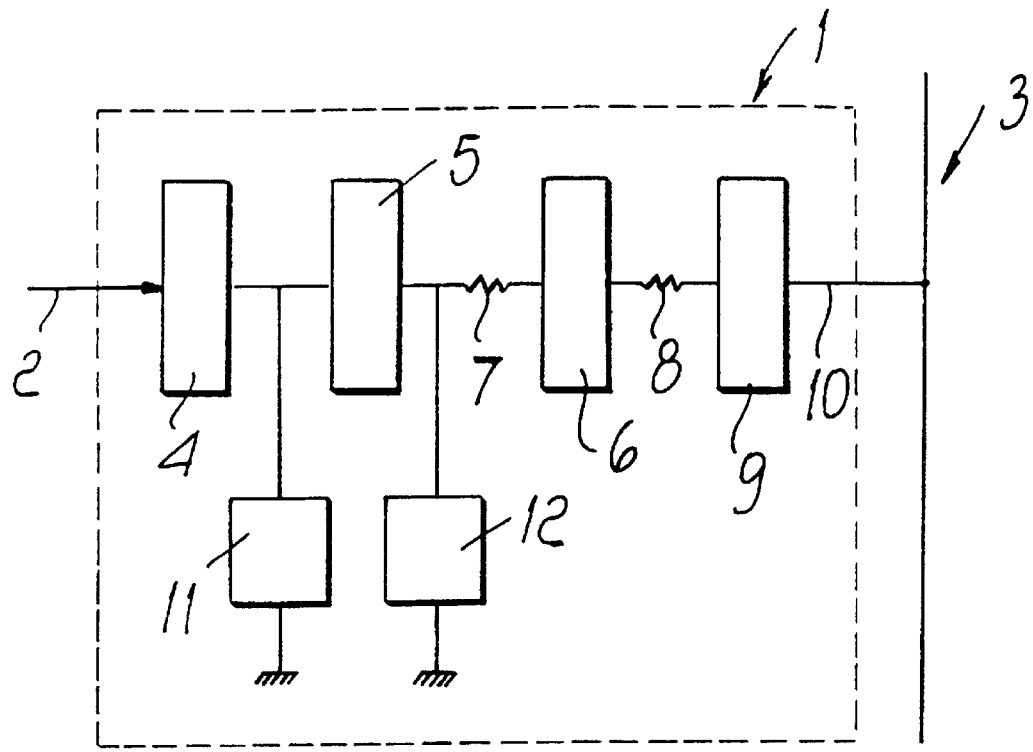
FIG. 1 is a block diagram of an example of a known interruption and. disconnecting device for high-voltage applications.
Figure 2:
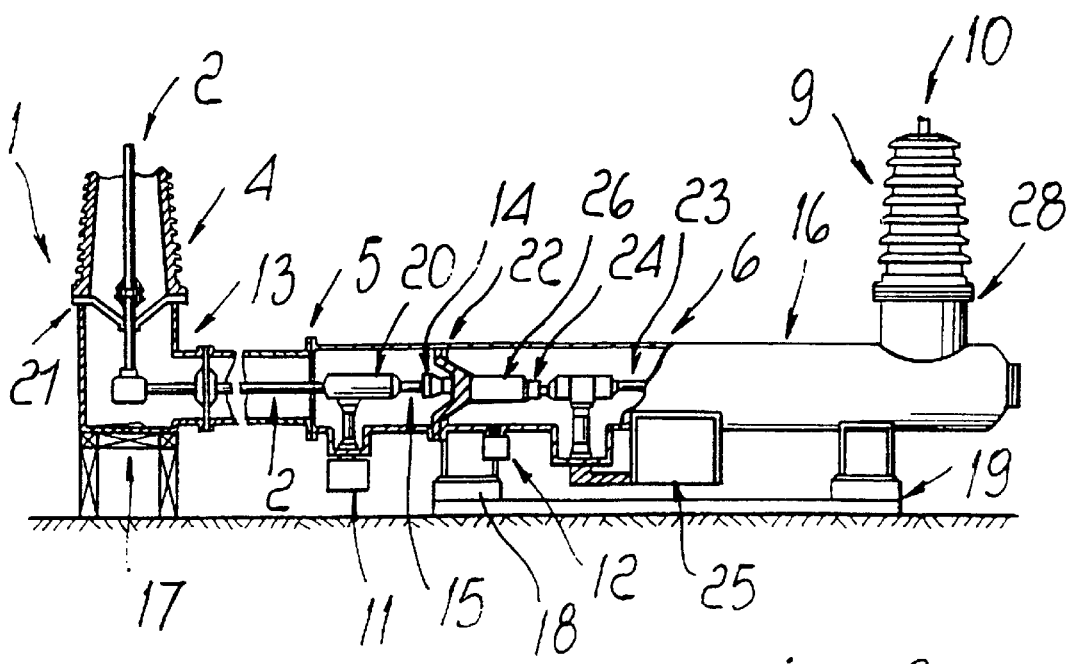
FIG. 2 is a schematic example of embodiment of an interruption and disconnecting device for high-voltage applications.

As illustrated in FIG. 3. the interruption and disconnecting device according to the invention comprises an input insulating bushing 51 which is electrically connected to a main power line 50. A transformer 53 is generally placed at the base of the insulating bushing 51 in order to measure the current in input to the device. The insulating bushing 51 is connected to an intermediate chamber 55 and is insulated from it by means of the partition 56.

The intermediate chamber 55 and the insulating bushing 51 are filled with a dielectric fluid having a very low environmental impact or even non-impact at all. for example a gaseous mixture of sulfur exafluoride and nitrogen ($SF_6$+ $N_2$), or pure nitrogen gas ($N_2$), or air.

The intermediate chamber 55 is connected to an interruption pole 54 and is insulated from it by means of the partition 57; in its turn, the interruption pole 54 is structurally connected to a disconnection chamber 67 by means of the partition 73. The interruption pole 54 has a free volume, delimited by its casing 200 and the partitions 73 and 57, which accomodates an interruption chamber 63.

Said interruption chamber 63 contains interruption mechanisms which comprise at least a fixed contact 64 and at least a moving contact 59. The moving contact 59 is rigidly coupled to a guiding rod 61 which is moved by an actuation system 62. for example of the linking rod-crank type; the fixed contact 64 is connected to the disconnection chamber 67 by means of a sealed connection 66.

As illustrated. the actuation system 62, the guiding rod 61 of the moving contact. the moving contact 59 and the fixed contact 64 are arranged inside the casino, of the interruption chamber 63; said casing of the chamber 63 can be made of insulating material, for example fiberglass-reinforced plastic. at least in the part that surrounds the moving contact 59, the fixed contact 64 and the rod 62. Field shields 68 and 69 are positioned around the casing of the interruption chamber 63; alternatively, the casing of the interruption chamber 63 can be used in its end part as field shield, without having to use the field shield 69 and the closure flange 72.

The interruption chamber 63 is hermetically closed, in one end portion, by a flange 72 and is connected, at the opposite end, to the casing of the interruption pole 54 by means of the sealing flange 65; the casing, of the interruption pole 54 i can be made, for example. of conducting plastic.

In this way. the interruption chamber 63 is advantageously sealed with respect to the remaining parts of the interruption pole 54. As a consequence, the interruption chamber 63 can be filled with a highly dielectric fluoridized fluid, preferably sulfur exafluoride ($SF_6$), by means of the valve 71, while the interruption pole 54 is filled by means of the valve 74, in the part of the free volume that is not occupied by the chamber 63, with a different dielectric fluid, such as for example a gaseous mixture of sulfur exafluoride and nitrogen ($SF_6$+ $N_2$), or pure nitrogen gas ($N_2$), or air. Alternatively, the interruption chamber 63 can be filled with a dielectric fluoridized fluid chosen among the group constituted by perfluoropolyethers (PFPE), or perfluorocarbons (PFC), or fluorocarbons (FC).

This solution is particularly advantageous in that it allows to segregate the. insulation means which have a high arc quenching power, but a high environmental impact as well, only where it is strictly necessary, that is to say, inside the casing of the interruption chamber 63 at the moving contact and. at the fixed contact. In this manner the volume of potentially polluting means used in the device is minimized.

Furthermore, their segregation inside the sealed chamber 63 allows adequate control and prevents their dispersion into the atmosphere. In fact, the intermediate chamber 55 comprises a first portion of a piston-operated protection system 58 which interrupts the electrical connection to the main power line if a pressure loss of the dielectric fluid used in the interruption pole 54 occurs. A second portion of the piston-operated protection system 58 is positioned inside the interruption pole 54 and is connected to the moving contact 59 of the interruption chamber 63 by means of a sealed connection 60. According to an alternative embodiment, the conductor 50 of the insulating bushing 51 can be directly connected to the interruption chamber 63.

A further advantage resides in the fact that, by acting on the connections 60 and 66 and on the flange 65, the interruption chamber 63 can be extracted from the interruption pole 54 by acting in the direction of the arrow 70.

This solution is advantageous in that it allows to fully replace the chamber 63 if the parts subjected to the most intense wear, that is to say, the moving contact 59 and the fixed contact 64, are damaged. considerably facilitating maintenance of the device.

The disconnection chamber 67 contains a moving contact 75 which, by means of a movement system 76, for example of the rack type, can be connected to a first fixed contact 77 or to a second fixed contact 78. The first fixed contact 77 connects the moving contact 75 to the output insulating bushing 80, while the second fixed contact 78 connects the moving contact 75 to the outer casing 79, of the disconnector chamber 67, which is at ground potential. The actuation system 76 is actuated by an actuator 81, for example an electric motor. The insulating bushing 80 is separated from the disconnection chamber 67 by means of a partition 82; a transformer 83 is generally placed at the base of the through conductor 80 and measures the current in output from the device.

The disconnection chamber 67 and the insulating bushing 80 are filled with a dielectric fluid having a very low environmental impact, or even non-impact at all, such as for example a gaseous mixture of sulfur exafluoride and nitrogen ($SF_6+N_2$), or pure nitrogen gas ($N_2$), or air.

The interruption and disconnecting device according to the invention is particularly suitable for use in high- and/or medium-voltage substations for distributing and transmitting electric power. Accordingly, the present invention also relates to a high- and/or medium-voltage substation for distributing and transmitting electric power, characterised in that it comprises an interruption and disconnecting device according to the invention.

With reference to FIG. 4, an alternative embodiment of the device according to the invention is schematically illustrated by indicating only the path of the current. In particular, the embodiment of FIG. 4 foresees the use of an interruption pole 89, a sealed interruption chamber 90 and three insulating bushings 91, 92 and 93.

The interruption chamber 90 is preferably filled with sulfur exafluoride $SF_6$, while the remaining volume of the interruption and disconnecting device is filled with insulating means having a very low environmental impact, or even non-impact at all, such as for example a mixture of sulfur exafluoride and nitrogen ($SF_6+N_2$), or pure nitrogen gas ($N_2$), or air. As regards the constructive details, reference can be made for example to FIG. 3. This embodiment is advantageous in that it allows to connect the device to multiple secondary. distribution bars for example in a substation.

In practices it has been found that the device according to the invention fully achieves the intended aim, since, thanks to the modularity of its structure, it is possible to minimize the pollution potential of the interruption and disconnecting device by segregating the insulating means which have a high environmental impact only at the parts that require a higher arc quenching power.

The device thus conceived is susceptible of modifications and variations, all of which are within the scope of the inventive concept; for example, it is possible to use multiple interruption chambers. In any case, however, the advantages encountered in the above described embodiments of the invention are maintained.

All the details may furthermore be replaced with technically equivalent elements. In practice, the considered circuit configurations, so long as they are compatible with the specific use, as well as the single components, may be any according to requirements and the state of the art.

What is claimed is:

1. An interruption and disconnecting device for high- and/or medium-voltage applications, comprising:
   a disconnection chamber and an interruption pole having a casing which delimits a free volume accommodating an interruption chamber which contains a moving contact and a fixed contact, said interruption pole and said disconnection chamber containing dielectrically insulating fluids, characterized in that said interruption chamber is sealed with respect to a remaining part of the interruption pole.

2. An interruption and disconnecting device according to claim 1, wherein said sealed interruption chamber and the free volume of the interruption pole that is not occupied by the interruption chamber contain a first dielectric fluid and a second dielectric fluid, respectively, said first and second dielectric fluids being different to each other.

3. An interruption and disconnecting device according to claim 2, wherein said first dielectric fluid comprises a dielectric fluoridized fluid.

4. An interruption and disconnecting device according to claim 3, wherein said dielectric fluoridized fluid is sulfur hexafluoride.

5. An interruption and disconnecting device according to claim 3, wherein said dielectric fluoridized fluid is chosen among the group constituted by perfluorocarbons, or fluorocarbons or perfluoropolyethers.

6. An interruption and disconnecting device according to claim 2, wherein said second dielectric fluid comprises a mixture of sulfur hexafluoride and nitrogen.

7. An interruption and disconnecting device according to claim 2, wherein said second dielectric fluid comprises pure nitrogen gas.

8. An interruption and disconnecting device according to claim 2, wherein said second dielectric fluid comprises air.

9. An interruption and disconnecting device according to claim 1, wherein the casing of the interruption chamber also acts as an electric field shield.

10. An interruption and disconnecting device according to claim 1, wherein the casing of said interruption chamber is at least partly made of an insulating material.

11. An interruption and disconnecting device according to claim 1, wherein said sealed interruption chamber can be extracted with respect to the body of the interruption pole.

12. A high- and/or medium-voltage substation for distributing and transmitting electric power, comprising an interruption and disconnecting device according to claim 1.

13. An interruption and disconnecting device for high- and/or medium-voltage applications, comprising:
   a disconnection chamber and an interruption pole having a free volume accommodating an interruption chamber which contains a moving contact and a fixed contact, said interruption pole and said disconnection chamber containing dielectrically insulating fluids,
   wherein said interruption chamber is sealed, and said sealed interruption chamber can be extracted with respect to a body of the interruption pole.

* * * * *